(12) United States Patent
Baek

(10) Patent No.: US 7,508,655 B2
(45) Date of Patent: Mar. 24, 2009

(54) DISPLAY DEVICE

(75) Inventor: Jin Uk Baek, Daegoo-si (KR)

(73) Assignee: LG Electronics Inc., Seoul (KR)

( * ) Notice: Subject to any disclaimer, the term of this patent is extended or adjusted under 35 U.S.C. 154(b) by 489 days.

(21) Appl. No.: 11/153,614

(22) Filed: Jun. 16, 2005

(65) Prior Publication Data

US 2006/0028790 A1    Feb. 9, 2006

(30) Foreign Application Priority Data

Aug. 6, 2004    (KR) ............ 10-2004-0062075

(51) Int. Cl.
*G06F 1/16* (2006.01)

(52) U.S. Cl. ............ 361/681; 248/917; 248/918; 349/58; 349/60

(58) Field of Classification Search ......... 361/679, 361/681, 683; 349/58, 60; 248/917, 918
See application file for complete search history.

(56) References Cited

U.S. PATENT DOCUMENTS

| | | | |
|---|---|---|---|
| 4,727,285 A | 2/1988 | Taniguchi et al. | |
| 5,268,816 A * | 12/1993 | Abell et al. | 361/681 |
| 5,274,486 A * | 12/1993 | Yamazaki et al. | 349/58 |
| 5,293,262 A * | 3/1994 | Adachi et al. | 349/149 |
| 5,422,751 A * | 6/1995 | Lewis et al. | 349/59 |
| 6,034,751 A * | 3/2000 | Kamiya | 349/60 |
| 6,507,377 B1 * | 1/2003 | Jung | 349/60 |
| 6,597,416 B1 * | 7/2003 | Momose | 349/60 |
| 6,697,250 B2 * | 2/2004 | Kuo | 361/681 |
| 6,894,739 B2 * | 5/2005 | Sung et al. | 349/58 |
| 6,919,937 B2 * | 7/2005 | Kim et al. | 349/58 |
| 7,072,007 B2 * | 7/2006 | Kaneko | 349/58 |
| 2001/0000763 A1 | 5/2001 | Muramatsu | |
| 2002/0080298 A1 * | 6/2002 | Fukayama | 349/58 |
| 2005/0285990 A1 * | 12/2005 | Havelka et al. | 349/58 |

FOREIGN PATENT DOCUMENTS

DE    33 13 080 A1    10/1984
WO    WO-2004/008233 A    1/2004

\* cited by examiner

*Primary Examiner*—Jayprakash N Gandhi
*Assistant Examiner*—Anthony Q Edwards
(74) *Attorney, Agent, or Firm*—Birch, Stewart, Kolasch & Birch, LLP

(57) ABSTRACT

A display device is provided. The display device includes a display module for displaying a video image, a circuit board for providing a video signal and a control signal to the display module, and a fixing plate fixed on a rear surface of the display module. The circuit board is inserted into and fixed to the fixing plate through elastic deformation of a portion of the fixing plate.

10 Claims, 6 Drawing Sheets

DISPLAY DEVICE

This nonprovisional application claims priority under 35 U.S.C. § 119(a) on Patent Application No. 10-2004-0062075 filed in Korea on Aug. 6, 2004, which is herein incorporated by reference.

BACKGROUND OF THE INVENTION

1. Field of the Invention

The present invention relates to a display device, and more particularly, to a display device having a fixing plate for fixing a circuit board thereto for driving a display module of the display device.

2. Description of the Related Art

Flat display devices are used as monitors of desktop computers and also used in various electronic devices such as notebook computers, personal digital assistants (PDA) and portable phones. Examples of such flat display devices include a liquid crystal display (LCD), a plasma display panel (PDP) and a field emission display (FED).

FIG. 1 illustrates a construction of a related art flat display device, and FIG. 2 illustrates a structure in which a circuit board is fixed in the related art flat display device. Referring to FIGS. 1 and 2, a display device includes a plastic rear cover 30, a metallic frame 40, a display module 20, and a plastic front cover 10 connected to the rear cover 30.

The frame 40 is disposed on a rear surface of the display module 20, and a circuit board 41 for controlling an operation of the display module 20 is connected on a rear surface of the frame 40. The circuit board 41 is fixed to the frame 40 with a fixing member such as a screw, and the frame 40 supports the circuit board 41. The display module 20 displays an image in accordance with a video signal and a control signal outputted from the circuit board 41.

The related art flat display device undesirably has increased thickness and weight because it uses a thick metallic frame 40. Further, the related art flat display device undesirably requires a complicated assembly process because the circuit board 41 must be fixed to the frame 40 with a fixing member such as a screw.

SUMMARY OF THE INVENTION

Accordingly, the present invention is directed to a display device that substantially obviates one or more problems due to limitations and disadvantages of the related art.

An object of the present invention is to provide a display device having an improved installation structure for a circuit board thereof, thereby making it possible to greatly reduce the total thickness and weight thereof.

Another object of the present invention is to provide a display device having an improved installation structure for a circuit board thereof, thereby making it possible to easily install a circuit board thereof on a display module thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly-pointed out in the written description and claims hereof as well as the appended drawings.

To achieve these objects and other advantages and in accordance with the purpose of the invention, as embodied and broadly described herein, a display device includes a display module for displaying a video image, a circuit board for providing a video signal and a control signal to the display module, and a fixing plate fixed on a rear surface of the display module and having a fixing portion for fixing the circuit board to the fixing plate.

In another aspect of the present invention, a display device includes a display module for displaying a video image, a circuit board for providing a video signal and a control signal to the display module, and a fixing plate fixed on a rear surface of the display module, the circuit board being inserted into and fixed to the fixing plate through elastic deformation of the fixing plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
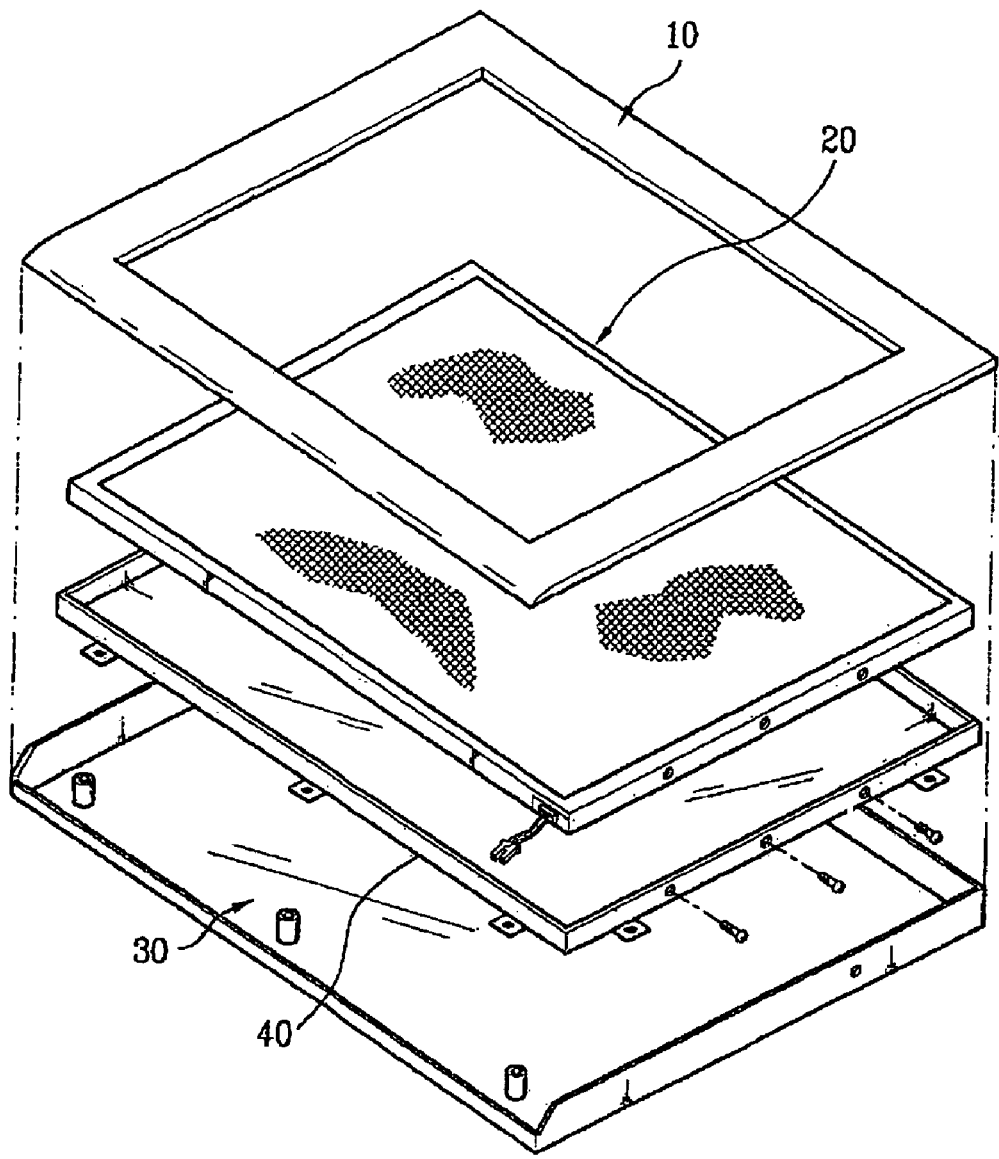
FIG. 1 illustrates a construction of a related art flat display device.
Figure 2:
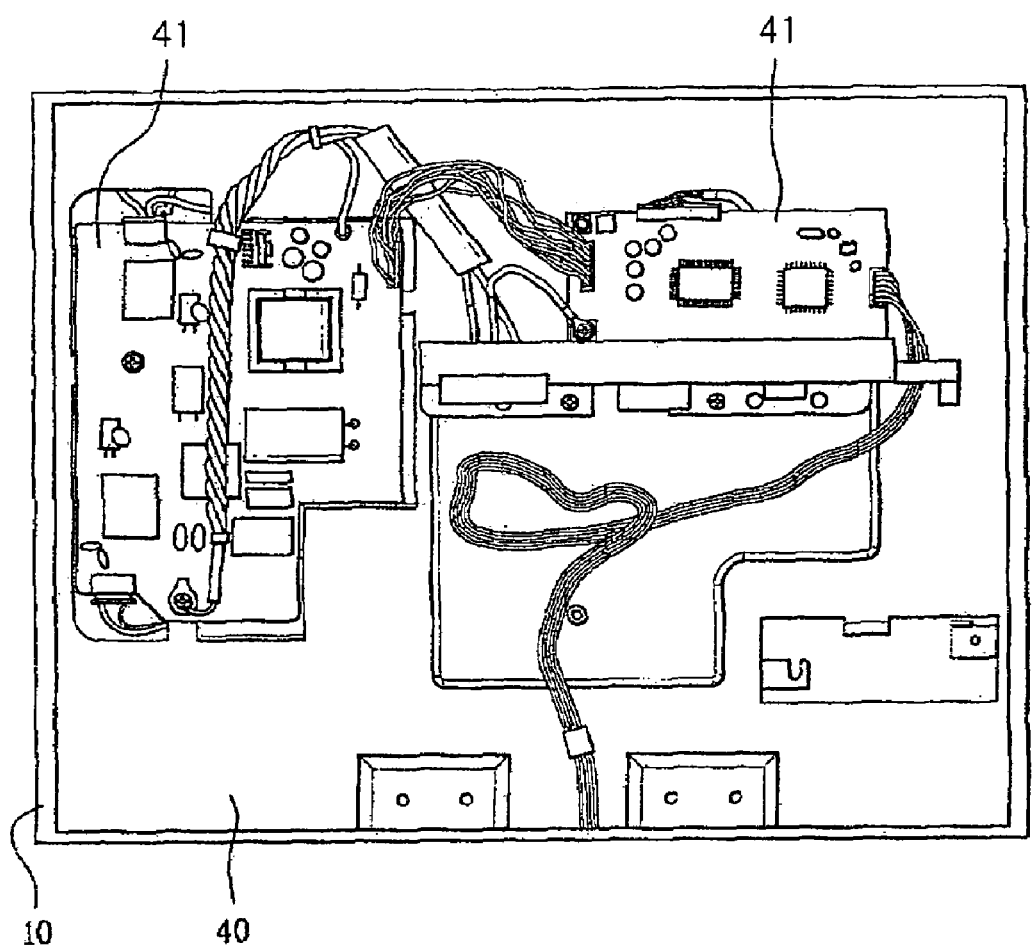
FIG. 2 illustrates a structure in which a circuit board is fixed in a related art flat display device.
Figure 3:
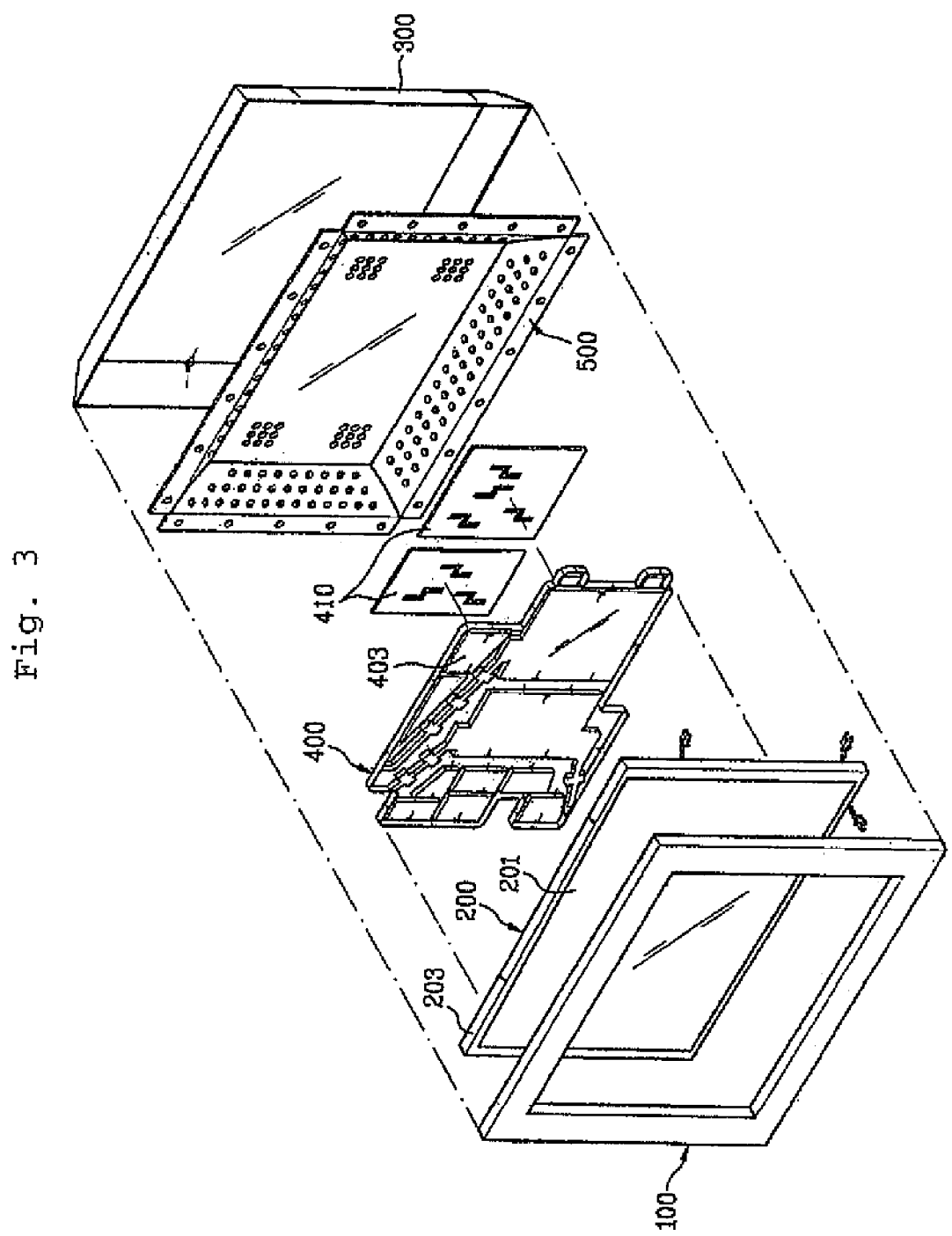
FIG. 3 is an exploded perspective view of a display device according to the present invention.
Figure 4:
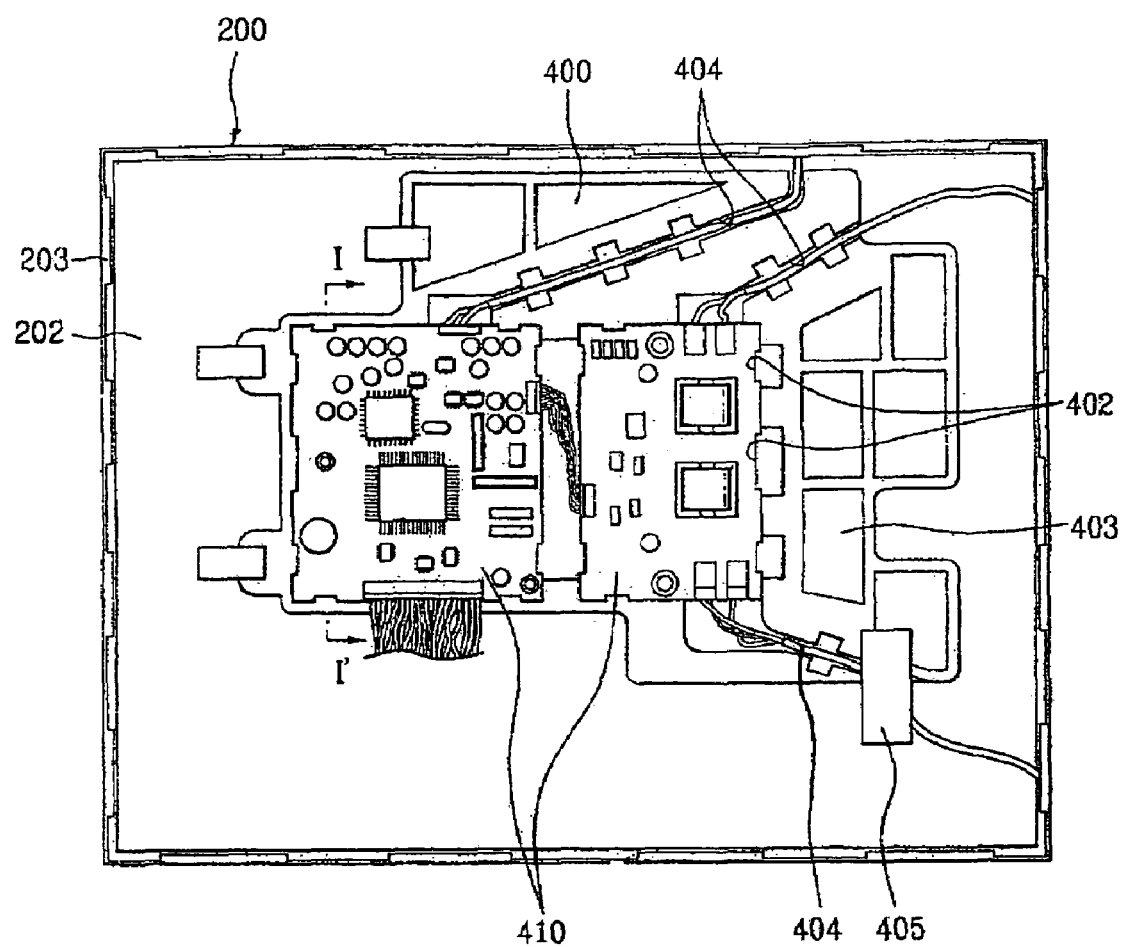
FIGS. 4 and 5 illustrate a structure in which a circuit board is fixed to a fixing plate in a display device according to the present invention.
Figure 5:
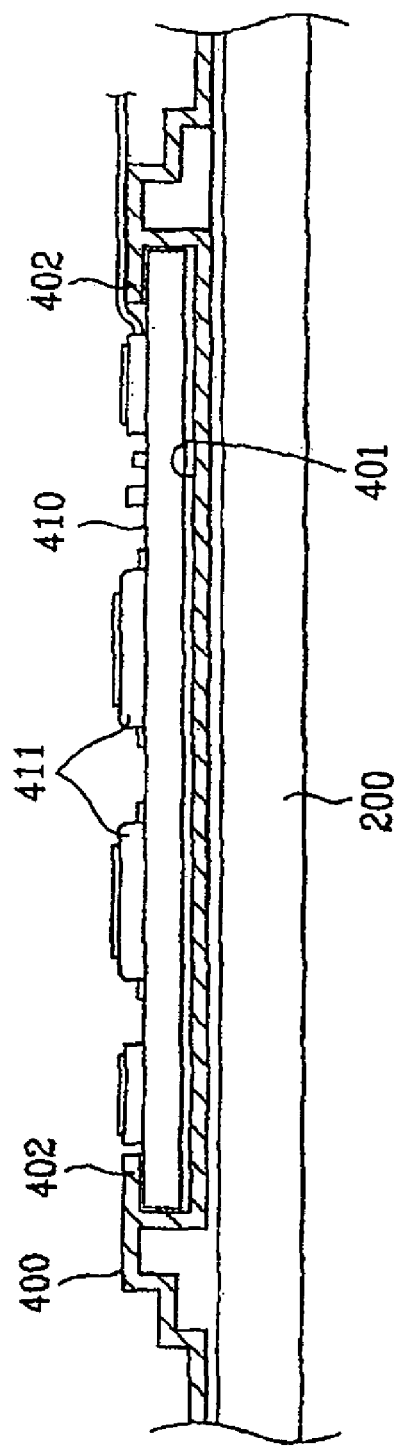

FIG. 3 is an exploded perspective view of a display device according to the present invention, and FIGS. 4 and 5 illustrate a structure in which a circuit board is fixed to a fixing plate in a display device according to the present invention.

Referring to FIG. 3, the inventive display device includes a front cover 100, a rear cover 300 connected to the front cover 100, a display module 200 disposed between the front and rear covers 100 and 300, a fixing plate 400 connected on a rear surface of the display module 200, and a circuit board 410 fixed to the fixing plate 400 and supplying a video signal and a control signal to the display module 200. The front and rear covers 100 and 300 constitute a housing of the display device, and may be made of plastic.

The display module 200 is fixed to the front or rear cover 100 or 300, and displays a video in accordance with inputted video and control signals. The display module 200 includes a display panel 201 for displaying video, a mold frame 202 for supporting a rear surface of the display panel 201, a backlight unit (not shown) installed in the mold frame 202 to provide a light source to the display panel 201, and a rectangular frametype metal chassis 203 for supporting the display panel 201, the mold frame 202 and the backlight unit. The mold frame 202 may be made of plastic.

As shown in FIGS. 4 and 5, a fixing plate 400 for fixing at least one circuit board 410 (which provides a video signal and a control signal to the display panel 201) is located on the mold frame 202 of the display module 200. The fixing plate 400 is fixed on the mold frame 202 with an insulating adhesive material, such as tape 405 or an insulating adhesive. The fixing plate 400 is preferably made of non-conductive material, for example, plastic. The fixing plate 400 has a recess 401 formed therein that corresponds to the size and shape of the circuit board 410.

The circuit board 410 is inserted into and fixed to the recess 401. Locking members 402 are formed at the periphery of the recess 401, and lock the circuit board 410 inserted into the recess 401. The locking members 402 are elastically deformable and have elasticity suitable for fixing the inserted circuit board 410 to the fixing plate 400 without using a separate fastening member.

As shown in FIG. 5, the circuit board 410 is completely inserted into the fixing plate 400 (specifically, the recess 401), and circuit components 411 such as various ICs (integrated circuits) are mounted on the circuit board 410 in such a way to protrude outside the fixing plate 400.

Figure 6:
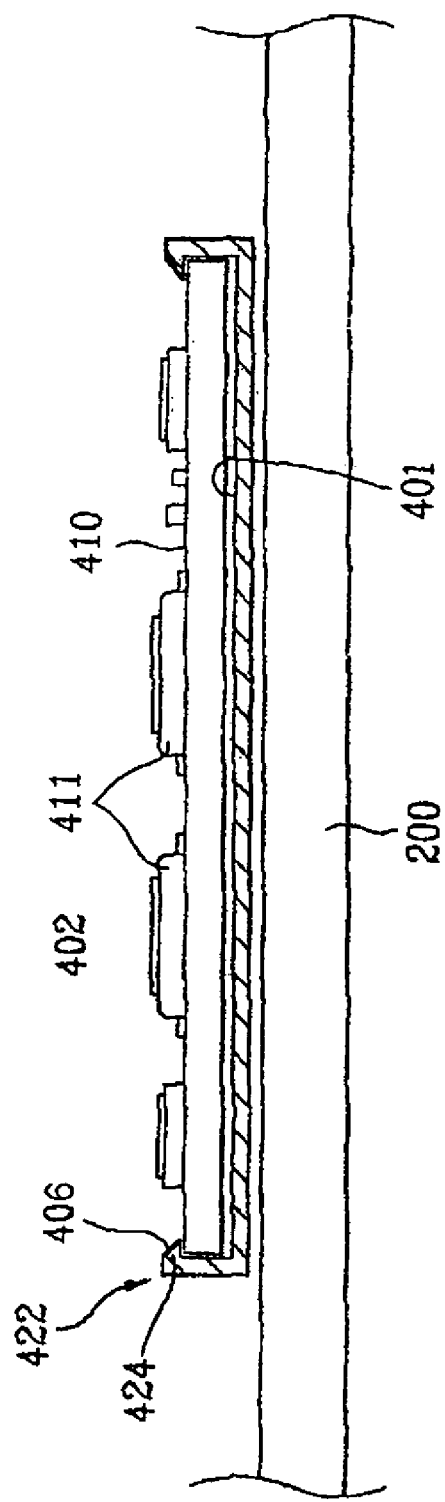
FIG. 6 illustrates an alternative structure in which a circuit board is fixed to a fixing plate in a display device according to the present invention.

As shown in FIG. 6, the fixing member may be configured as a deflectable snap-in locking tab 422 formed on the fixing plate 400 so as to secure the circuit board 410 to the fixing plate 400. More specifically, the snap-in locking tab 422 has a hook portion 424 at a distal end thereof with an inclined surface 426. The inclined surface 426 is contacted by the circuit board 410 being installed to the fixing plate 400, and causes the locking tab 422 to deflect outwardly so that the circuit board 410 can be located under and secured by the hook portion 424 of the locking tab 422. In addition, FIG. 6 shows that the fixing plate 400 may be configured without the recess 401 shown in FIG. 5 for receiving the circuit board 410.

The fixing plate 400 is preferably formed of non-combustible or low combustible material so as to resist sparks or flames that may be generated at the circuit board 410, and preferably has at least one or more convex beads 403 formed thereon for reinforcing the stiffness thereof. Also, the fixing plate 400 preferably has one or more guide grooves 404 therein for guiding electric wires connected respectively to the display module 200, an external power source, and external electronic devices.

As shown in FIG. 3, a porous aluminum shield 500 for preventing the spread of an electromagnetic wave and a flame that may be generated at the circuit board 410 is preferably formed between the display module 200 and the rear cover 300.

In the inventive display device, the fixing plate 400 is fixed on a rear surface of the mold frame 202 of the display module 200 with an adhesive material, such as adhesive tape 405. Thereafter, when being pushed into the recess 401 of the fixing plate 400, the circuit board 410 is inserted into the recess 401 by elastically deforming the elastic recess 401, and is then supported and fixed by the elastic recess 401. Thereafter, the shield 500, the front cover 100 and the rear cover 300 are connected with each other, whereby the inventive display device is completely assembled.

As stated above, the present invention fixes the circuit board for driving the display module to the thin light plastic fixing plate, thereby reducing the thickness and weight of the display device. Also, the present invention makes it possible to easily fix the circuit board to the fixing plate, thereby facilitating the assembly of the display device.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display device comprising:
   a front cover;
   a rear cover coupled to the front cover;
   a display module disposed between the front cover and the rear cover; a circuit board to provide a signal to the display module; and
   a fixing plate disposed between the display module and the rear cover, and fixed on a surface of the display module and having an elastically deformable fixing member to fix the circuit board to the fixing plate,
   wherein the circuit board is located between the fixing plate and the rear cover.

2. The display device according to claim 1, wherein the fixing plate includes a concave recess formed therein corresponding to a shape and size of the circuit board, so that the circuit board may be inserted into the recess and fixed by the fixing member.

3. The display device according to claim 2, wherein the fixing member comprises a locking member formed at a periphery of the recess so as to support the circuit board inserted into the recess.

4. The display device according to claim 1, wherein the fixing plate is fixed on a rear surface of the display module with an insulating adhesive tape.

5. The display device according to claim 1, wherein the fixing plate is fixed on a rear surface of the display module with an insulating adhesive.

6. The display device according to claim 1, wherein the fixing plate is non-combustible.

7. The display device according to claim 1, wherein the fixing plate is non-conductive.

8. The display device according to claim 1, wherein the fixing plate has a concave guide groove for guiding an electric wire connected to the circuit board.

9. The display device according to claim 1, wherein the fixing member comprises a deflectable tab formed on the fixing plate so as to secure the circuit board to the fixing plate.

10. The display device according to claim 9, wherein the deflectable tab comprises a snap-in locking tab.

* * * * *